UNITED STATES PATENT OFFICE.

GASTON PHILIPPE GUIGNARD, OF MELUN, FRANCE.

PROCESS FOR THE DECOMPOSITION OF NITROGEN COMPOUNDS OF TITANIUM.

1,411,087. Specification of Letters Patent. Patented Mar. 28, 1922.

No Drawing. Application filed February 17, 1921. Serial No. 445,790.

*To all whom it may concern:*

Be it known that I, GASTON PHILIPPE GUIGNARD, a citizen of the French Republic, and a resident of 5 Avenue des Marronniers, Melun, Department of Seine et Marne, France, have invented new and useful Improvements in a Process for the Decomposition of Nitrogen Compounds of Titanium, of which the following is a specification.

This invention relates to a process for the extraction of atmospheric nitrogen from nitrogen compounds of titanium.

Such processes have already been proposed in which these compounds were treated with water vapour and atmospheric air, the treatment being carried out under pressure in certain cases. Water vapour has also been employed as the decomposing agent, but in the presence of salts of metallic hydrates. All these processes have apparently been recognized as inefficacious, because the reactions were carried out at such high temperatures that the ammonia produced was decomposed.

It has indeed been shown by Ramsay and Young that gaseous ammonia, when heated, is decomposed into its elements and that this decomposition appears to be favoured by the nature of the substances in contact with the ammonia; thus in a porcelain tube filled with fragments of porcelain, the decomposition which amounts to only 1.57 per cent. of the total quantity of ammonia at 500 degrees C. rises to 69.50 per cent at 810–830 degrees C.

If the experiment is carried out in an iron tube filled with fragments of porcelain, the decomposition is greater still, because it amounts to 1.45 per cent at 507–529 degrees C. and becomes complete at 780 degrees C.

Experiments show that with a rapid current, the decomposition is less energetic than with a slow current.

In a glass tube there is no decomposition.

The process according to the present invention consists essentially in the fact that, in order to decompose the nitrogen compounds of titanium obtained in the usual manner, there is employed water vapour, alone or mixed with oxygen, under vacuum, so as to remove the nitro-products resulting from the decomposition of the titanium compounds when and as formed and at a temperature, between 360 and 500 degrees C. Good results are obtained when working under a vacuum of 600 to 650 m. m. of mercury—i. e. under a pressure of 160 to 110 m. m. of mercury.

Under these conditions, the decomposition of the titanium compounds takes place completely without any material decomposition of the ammonia at the same time.

The nitrogen compounds of titanium give the following reaction:

$$Ti_nN_m + 2nH_2O = nTiO_2 + mNH_3.$$

The carbazotic or cyanogen compounds of titanium yield titanic acid, hydrocyanic acid and ammonia.

For the separation of ammonia and hydrocyanic acid, there are two cases to be considered, according as it is desired to recover the hydrocyanic acid or to destroy it.

First case: to recover the hydrocyanic acid.

The products of the reaction, after having been cooled, are conducted into scrubbers containing alkaline lyes or milk of lime; these reagents are maintained at a low temperature.

The hydrocyanic acid is fixed in the form of cyanide and the ammonia is set free.

Second case: to destroy the hydrocyanic acid.

Hydrocyanic acid being decomposed by heat into formic acid and ammonia, the products of the reaction are led into heated lime water or alkali metal lyes; ammonia and an alkali metal formate are obtained.

Two further cases are now to be considered, according to whether or not it is desired to prepare formic acid.

In the one case, the formate is concentrated, which serves to produce formic acid.

If it is not desired to obtain formic acid, the latter is transformed into calcium formate which is decomposed by heat into calcium carbonate and formol (formaldehyde).

I claim—

1. A process for the decomposition of nitrogen compounds of titanium, which comprises treating said compounds with water vapour, under vacuum and at a temperature between 360 and 500 degrees centigrade, and removing, when and as formed, the nitrogenous products resulting from the operation.

2. A process for the decomposition of nitrogen compounds of titanium, which comprises treating said compounds with water vapour, mixed with oxygen, under vacuum and at a temperature between 360 and 500 degrees centigrade, and removing, when and as formed, the nitrogenous products resulting from the operation.

3. A process for the decomposition of cyanogen compounds of titanium, which comprises treating said compounds with water vapour, under vacuum and at a temperature between 360 and 500 degrees centigrade, and removing, when and as formed, the nitrogenous products resulting from the operation.

4. A process for the decomposition of cyanogen compounds of titanium, which comprises treating said compounds with water vapour, mixed with oxygen, under vacuum and at temperature between 360 and 500 degrees centigrade, and removing, when and as formed, the nitrogenous products resulting from the operation.

In testimony whereof I have signed my name to this specification.

GASTON PHILIPPE GUIGNARD.

Witnesses:
J. ARMENGANDAMI,
H. DEFÉVRIMONT.